US010324778B2

(12) United States Patent
Bearden et al.

(10) Patent No.: US 10,324,778 B2
(45) Date of Patent: Jun. 18, 2019

(54) UTILIZING AN ERROR PREDICTION AND AVOIDANCE COMPONENT FOR A TRANSACTION PROCESSING SYSTEM

(71) Applicant: International Business Machines Corporation, Armonk, NY (US)

(72) Inventors: Donald Bearden, San Jose, CA (US); Benjamin P. Johnson, San Carlos, CA (US); Nai-Wen Shih, San Jose, CA (US); Carson W. Tsai, New Taipei (TW); Jack C. Yuan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 15/442,913

(22) Filed: Feb. 27, 2017

(65) Prior Publication Data
US 2018/0246778 A1    Aug. 30, 2018

(51) Int. Cl.
*G06F 11/00* (2006.01)
*G06F 11/07* (2006.01)

(52) U.S. Cl.
CPC ........ *G06F 11/0745* (2013.01); *G06F 11/079* (2013.01); *G06F 11/0751* (2013.01); *G06F 11/0793* (2013.01)

(58) Field of Classification Search
CPC .................................................. G06F 11/0745
See application file for complete search history.

(56) References Cited

U.S. PATENT DOCUMENTS

| | | | |
|---|---|---|---|
| 2008/0195440 A1 | 8/2008 | Bagshi et al. | |
| 2008/0223918 A1 | 9/2008 | Williams et al. | |
| 2008/0250265 A1 | 10/2008 | Chang et al. | |
| 2016/0140019 A1* | 5/2016 | Bertin ................. | G06F 11/3636 717/128 |
| 2018/0074884 A1* | 3/2018 | Cady ................... | G06F 11/0787 |
| 2018/0165169 A1* | 6/2018 | Camp ................. | G06F 11/2069 |

OTHER PUBLICATIONS

Harjender Singh, "Fault-tolerant computing : a recovery systems to enable software systems to survive faults and continue operations", International Journal of Research and Development in Technology and Management Science—Kailash, Mar. 2015, 11 pages.

* cited by examiner

*Primary Examiner* — Christopher S McCarthy
(74) *Attorney, Agent, or Firm* — Cantor Colburn LLP; Teddi Maranzano (57) ABSTRACT

According to embodiments a technique for utilizing an error prediction an avoidance component for a transaction processing system is provided. The technique includes identifying critical functions of the transaction processing system, and collecting usage data. The technique also includes determining a focus area based on the usage data for each of the critical functions, and generating a data message for the focus area, the data message combining internal data and the usage data. The technique includes transmitting the data message to a data processing component (DPC), the data message includes DPC timer information used by the DPC for performing a summarization process, and receiving a summary message from the DPC based on the summarization process performed by the DPC. The technique also includes identifying a summary message focus area from the summary message, and determining a condition of the summary message focus area of the summary message.

20 Claims, 7 Drawing Sheets

UTILIZING AN ERROR PREDICTION AND AVOIDANCE COMPONENT FOR A TRANSACTION PROCESSING SYSTEM

BACKGROUND

The present invention relates to computer processing systems, and more specifically, to utilizing an error prediction and avoidance component for a transaction processing system.

Transaction processing systems are used by many corporations for transactions such as payroll, order processing, reservations, employee records, accounts payable, accounts receivable, etc. Each series of operations/tasks for a transaction are bound together for transaction processing. The transaction will either be completed together successfully or fail in its entirety. In the event of an error, the system "rolls back" all of the operations/tasks of the transaction including those individual operations/tasks that were successful. Each transaction must adhere to the ACID properties (atomic, consistent, isolated, and durable). Distributed transactions provide the ability to incorporate distinct operations that are performed on different systems to be processed together as a single transaction. These distributed transactions can be coordinated by a distributed transaction coordinator that resides within each system.

SUMMARY

According to an embodiment, a computer-implemented method for utilizing an error prediction and avoidance component for a transaction processing system is provided. The method includes identifying critical functions of the transaction processing system, and polling usage data from each critical function of the transaction processing system. The method also includes determining a focus area based on the usage data for each of the critical functions and generating a data message for the focus area, the data message combining internal data and the usage data. The method includes transmitting the data message to a data processing component (DPC), the data message includes DPC timer information for the data processing component for performing a summarization process and receiving a summary message from the data processing component based on the summarization process of the data processing component. The method further includes identifying a focus area from the summary message, identifying a pre-error level, a normal level, and an error level for the focus area, and determining a condition of the identified focus area of the summary message.

According to another embodiment, a system for utilizing an error prediction and avoidance component for a transaction processing system is provided. The system includes a storage medium, the storage medium being coupled to a processor, where the processor configured to identify critical functions of the transaction processing system, and collect usage data from each critical function of the transaction processing system. The processor is further configured to determine a focus area based at least in part on the usage data for each of the critical functions, and generate a data message for the focus area, the data message combining internal data and the usage data. The processor is configured to transmit the data message to a data processing component (DPC), the data message includes DPC timer information used by the DPC for performing a summarization process, and receive a summary message from the DPC based at least in part on the summarization process performed by the DPC.

The processor is also configured to identify a summary message focus area from the summary message, identify a pre-error level, a normal level, and an error level for the summary message focus area, and determine a condition of the summary message focus area of the summary message.

According to a different embodiment, a computer program product for utilizing an error prediction and avoidance component for a transaction processing system is provided. The computer program product includes a computer readable storage medium having stored thereon first program instructions executable by a processor to cause the processor to identify critical functions of the transaction processing system, and collect usage data from each critical function of the transaction processing system. The program instructions are further executable to cause the processor to determine a focus area based at least in part on the usage data for each of the critical functions, and generate a data message for the focus area, the data message combining internal data and the usage data. The program instructions are further executable to cause the processor to transmit the data message to a data processing component (DPC), the data message includes DPC timer information used by the DPC for performing a summarization process, and receive a summary message from the DPC based at least in part on the summarization process performed by the DPC. The program instructions are further executable to cause the processor to identify a summary message focus area from the summary message, identify a pre-error level, a normal level, and an error level for the summary message focus area, and determine a condition of the summary message focus area of the summary message.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for utilizing an error prediction and avoidance component for a transaction processing system are provided.

Today's transaction processing systems (TPS) are powerful, and the largest corporations in the world rely on these transaction processing systems to run their business. The errors that occur in the transaction processing systems can severely impact the business operations. Some issues are intermittent and require follow-up actions, such as recreating the error and turning on performance-impacted traces to collect data associated with the error. These corporations and customers demand to have "smart" logic added to the transaction processing systems so that the problems in the system can be reduced and predicted before error levels are reached thereby minimally impacting their day-to-day operations.

The techniques described herein are used to detect a potential error in an early stage before an error level is reached. In order to prevent the potential errors in the TPS, a data message can be generated to provide a snapshot of a focus area of a critical function at that instant. These date messages can be summarized to analyze the trends with regards to the targeted focus area.

The system also includes other features such as automatically turning on traces to record the events that may be associated with a pre-error or error level. Without enabling the traces or when a trace is delayed, it can be difficult to pinpoint issues. In addition, the system is capable of providing status reports to the customers and logging the reports which can be used for troubleshooting. This allows the detection of issues before they are reported by the customers.

Customers may face difficulty trying to pinpoint the problems experienced in the TPS. These errors can be detected before it is reported by the customer. The error prediction and avoidance module can be introduced into a TPS system for predicting and preventing errors.

Previously customers were only notified when the error level was reached. The technique described herein, informs the customers of a prediction when a pre-error level will be exceeded and an error level will be reached. The customers can adjust their actions and/or the TPS can adjust its action before the error occurs.

Figure 1:
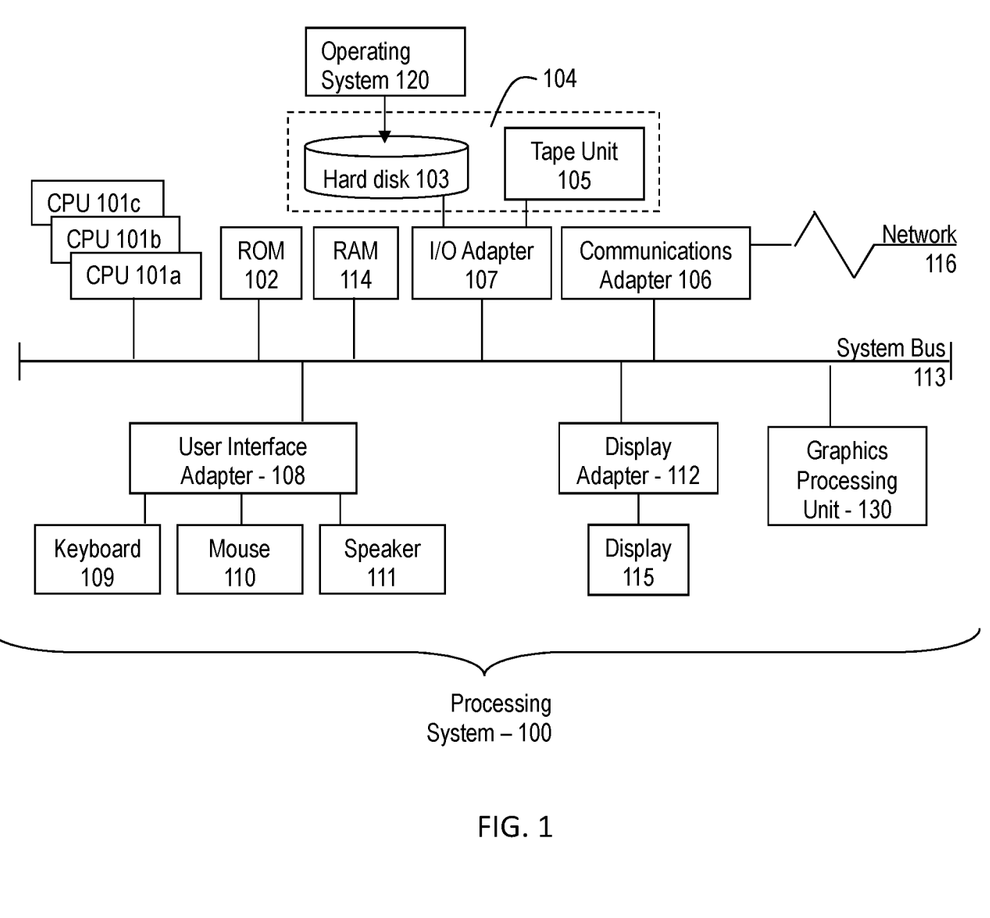
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
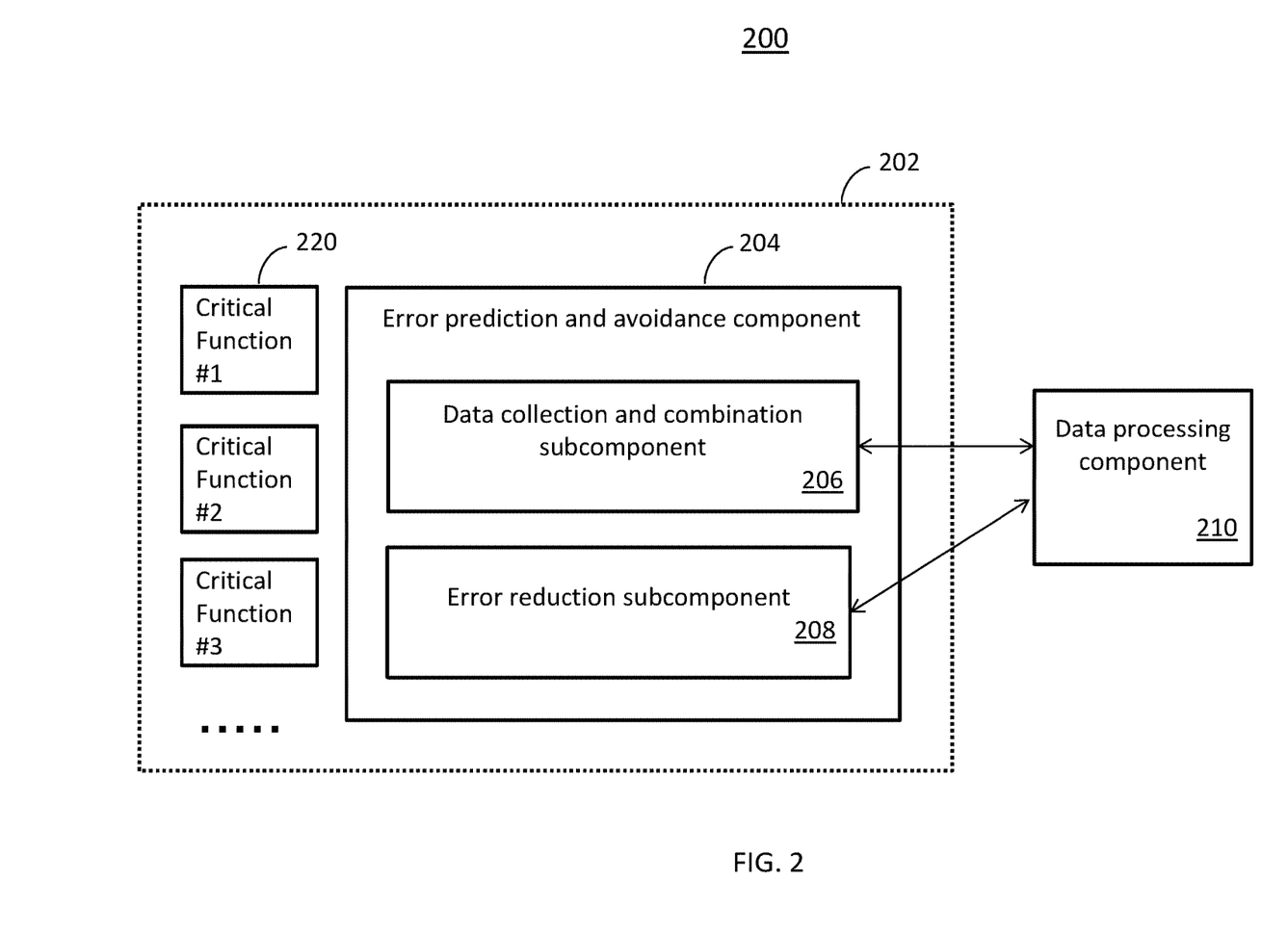
FIG. 2 is a block diagram illustrating a system for utilizing an error prediction and avoidance component for a transaction processing system.

Referring now to FIG. 2, a system 200 for utilizing an error prediction and avoidance component for transaction processing system is provided. The system 200 includes a transaction processing system 202. An example transaction processing system includes IBM's Information Management System (IMS) which is a joint hierarchical database and information management system with extensive transaction processing capabilities. As shown in FIG. 2, the transaction processing system 202 includes an error prediction and avoidance component 204. In one or more embodiments, the error prediction and avoidance component 204 can be implemented in hardware and/or software, or a combination thereof. The error prediction and avoidance component 204 as shown in FIG. 2 includes a data collection and combination subcomponent 206 and an error reduction subcomponent 208. These subcomponents can be implemented in hardware and/or software, or a combination thereof.

As shown in FIG. 2, the transaction processing system (TPS) 202 is configured to exchange data with the data processing component (DPC) 210. The TPS as shown in FIG. 2 includes an error prediction and avoidance component 204 that can be configured to communicate with the DPC 210. In one or more embodiments, the DPC 210 can be exclusive to the transaction processing system 202. In a different embodiment, the DPC 210 can be located outside of the TPS and can be shared among a plurality of TPS.

The data collection and combination subcomponent 206 can be configured to collect data from the critical functions 220 of the TPS 202. Different TPS can have different critical functions. Each critical function can have a plurality of focus areas of the critical function. This information reveals how particular critical functions are used in the TPS 202. In an embodiment, the data collection and combination subcomponent 206 can be controlled by a timer to poll the usage data from each critical function 220. By polling the usage data, focus areas of the critical function can be tracked for each TPS customer.

The data collection and combination subcomponent 206 can be configured to determine focus areas of each of the critical functions 220 based at least in part on the usage data collected from each critical function 220. The data collection and combination subcomponent 206 can generate data messages including insight data and the usage data from each critical function 220. Data messages can be generated for a focus area of a critical function 220. The data messages are used to develop a snapshot of the current state of the focus area for a particular user.

After the data message is generated by the data collection and combination subcomponent 206, it can be transmitted to the DPC 210 for further processing. The DPC 210 is configured to store each data message received from the data collection and combination subcomponent 206 in a database or memory. In one or more embodiments, the DPC 210 can store the data message based on information contained in the data message such as a system ID, a tracking ID, a critical function code, and/or a focus area code. In a different embodiment, other elements included in the data message can be used for storing the received data messages in the DPC.

The DPC 210 can be configured to activate a DPC timer for generating summary data for a focus area. In one or more embodiments, a DPC timer can be activated for a focus area associated with a data message if it is the first data message received for the focus area. In a different embodiment, the DPC timer can be altered by the error reduction subcomponent 208. The DPC timer period can be provided in a data message. Responsive to the DPC timer expiring, the DPC 210 can retrieve the data messages associated with the focus area from its storage and summarize the data messages based at least in part on a type to form a summary message.

The DPC 210 can be configured to transmit the summary message to the error reduction subcomponent 208 for further processing. The error reduction subcomponent 208 can identify the focus area from the summary message. For each identified summary message focus area, the error reduction subcomponent 208 can determine a pre-error level status, normal level status, and error level status for the focus area to determine if any action should be taken. The error reduction subcomponent 208 can take an action to address the status based at least in part on the determined state of the focus area. In one or more embodiments, the messages can be transmitted to a server for storage. For example, the summary message can be stored in an external mobile server.

After performing the mitigation operation, a check can be performed to determine if the action taken was successful where the TPS is no longer in the pre-error level. If not, a trace is turned on to record the executed tasks in the TPS to be used for troubleshooting the pre-error state. By automatically enabling the trace operation, the customer is no longer required to turn on the trace. In addition, the trace is turned on as soon as the event is detected instead of waiting until an error level has been reached and reported by a customer.

After the trace is turned on, the DPC timer that is used to generate the summary messages at the DPC is updated. The modification of the DPC timer can increase the frequency of the generation of summary messages used to inform the error reduction subcomponent 208 of a current status for a focus area. The error reduction subcomponent 208 can predict when the error level will be reached based at least in part on the data received in the summary message. The error reduction subcomponent 208 can generate and transmit a notification of the current state of the focus area. In one or more embodiments, the notification can be transmitted to the TPS customer affected by the approaching error level. In an embodiment, the current status, disposition, and action taken can be logged for subsequent reference.

In the event the pre-error level has been exceeded and an error level state exists, the error reduction subcomponent 208 can determine if the TPS has taken any action prior to the detection. If not, a mitigation operation can be performed. If a previous action has been taken, the error reduction subcomponent 208 can determine from the summary message whether the action taken has corrected the error. If so, the condition can be logged. Otherwise, a mitigation operation can be performed to address the error state. The mitigation operation can be similar the mitigation operation described above.

In the event a summary message is received indicating a normal level, a trace associated with the identified focus area can be turned off because there is no condition that warrants tracking. The current conditions can be logged.

Figure 3:
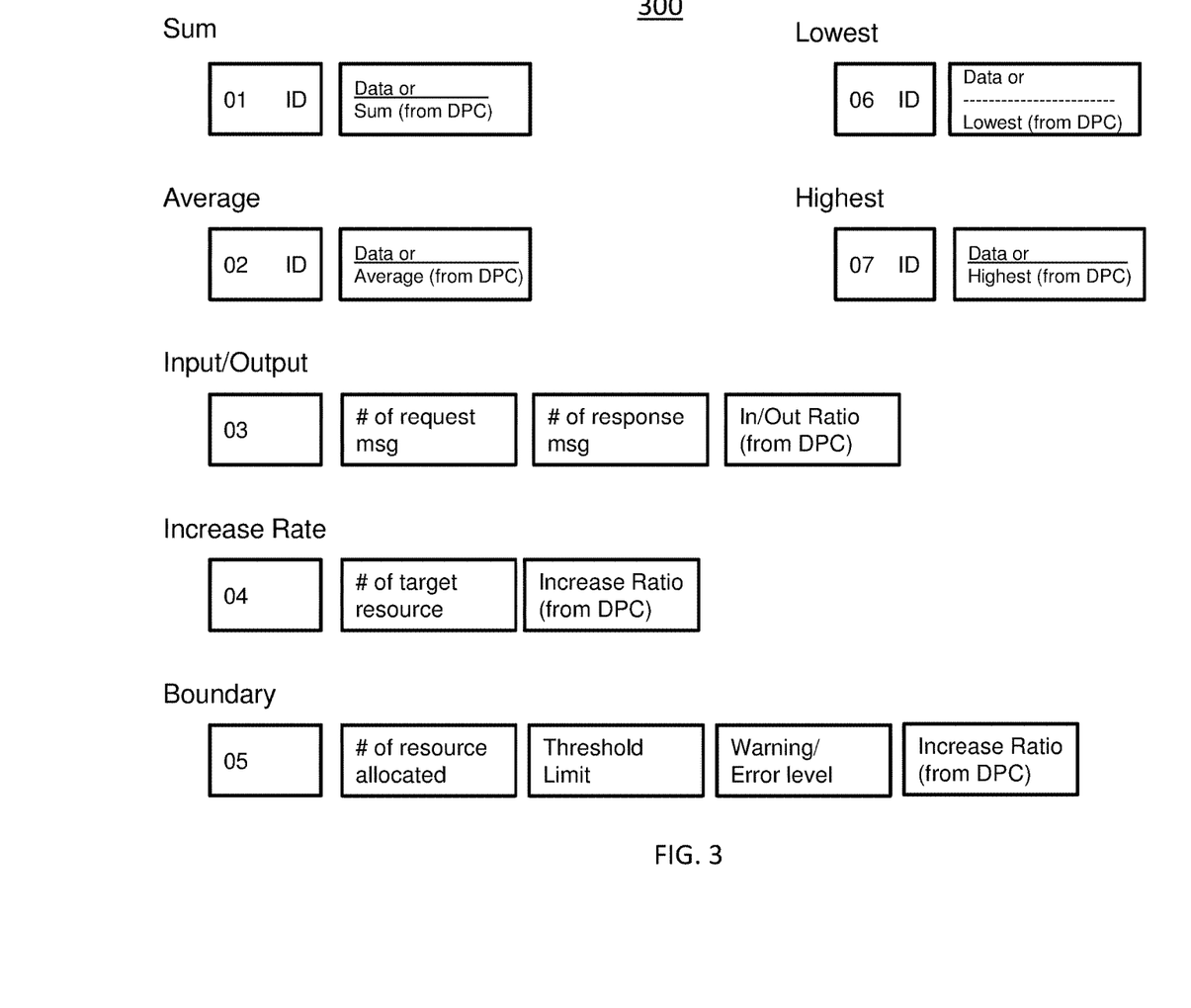
FIG. 3 illustrates combined data types used in a system for utilizing an error prediction and avoidance component for a transaction processing system.

Now referring to FIG. 3, a data message 300 for utilizing an error prediction and avoidance component for transaction processing system is shown. The data collection and combination component can generate data messages by combining the internal data for a focus area and the collected usage data for an associated critical function. The internal data includes the internal control/status data such as message length information, critical function codes, focus area codes, control flags, disposition codes, action taken codes, DPC timer, etc. FIG. 3 provides various combined data types for each focus area that can be combined with the internal data of the TPS to form a data message to be transmitted to the DPC. In another embodiment, the combined data types can include the Sum, Average, Low, High, Input/Output, Increase Rate and Boundary types. Other combined data types can be included as updates to the TPS and critical functions occur where different data is monitored and collected. For example, critical function updates can occur based on a critical function enhancement where a new feature is added to the critical function or a field authorized program analysis report (APAR) being reported to a critical function. The field APAR is a TPS bug/issue that can be reported by TPS customers and users. In either scenario, the error prediction and avoidance component would need to be updated to include the new feature.

The "Sum" type can be indicated by type 01, where the ID field indicates which segment of a plurality of segments the information is associated with. The second portion of the message includes the Data that will undergo a "Sum" operation. The Sum (from DPC) can be provided in a summary message that has added a plurality of data messages indicating a Sum type during a DPC timer period. The Sum of the data can be provided to the error reduction subcomponent through a summary message.

The "Average" type can be indicated by type 02, where the ID field indicates a particular segment of a plurality of segments that is associated with the information. The second portion of the combined data includes the Data that will be used in an "averaging" operation. The Average (from the DPC) can be provided in the summary message where the DPC has averaged the Data of a plurality of data messages during a DPC timer period.

The "Input/Output" type can be indicated by type 03. The next portion of the "Input/Output" data can include the number of request messages and a number of response messages that are associated with TPS. An Input/Output ratio can be determined for the request messages and the response messages at the DPC during a DPC timer period. This information can be combined together and provided to the error reduction subcomponent in a summary message.

The "Increase Rate" type can be indicated by type 04. This combined data type can include a field indicating the number of target resources and a field indicating an increased ratio (from DPC). The DPC is capable of calculating an increased ratio of the number of messages received during a DPC timer period for a particular focus area.

The "Boundary" type can be indicated by type 05. The boundary information can be used when tracking a "flooding" focus area. The information tracked in a "Boundary" message includes the number of resources allocated, a threshold limit, warning/error level, and Increase Ratio (from DPC). The threshold limit can indicate when a flood is detected. The warning/error level information can be used by the system and error reduction subcomponent to determine a pre-error level, normal level, and error level of operation. The Increase Ratio information can be provided from the DPC to indicate an increase in the number of allocated resources during a DPC timer period.

The "Lowest" type can be indicated by type 06 and a segment of a plurality of segments is identified in the ID field. The Data field includes the lowest data and the Lowest (from DPC) field can indicate the lowest value that has been received during a DPC timer period. The Lowest (from DPC) information can be provided in a summarization message.

The "Highest" type can be indicated by type 07, where the ID field can indicate a segment of a plurality of segments that has provided the data. The Highest Data value can be provided in the Data field. The Highest Data (from DPC) can be determined for a plurality of data messages received by the DPC within DPC timer period and provided by the DPC in a summary message.

Each type of combined data includes fields of data prepared by the data collection and combination subcomponent and/or fields of data prepared by the external data processing component. Each data message/summary message for a specific focus area of a critical function includes a plurality of fields and is used for error prediction and avoidance.

In one or more embodiments, one or more types of combined data can be included in a data message or summary message. Although seven combined data types for focus areas are shown in FIG. 3, the combined data types that have been provided are non-limiting examples of combined data types where other combined data types are considered to be within the scope.

Figure 4:
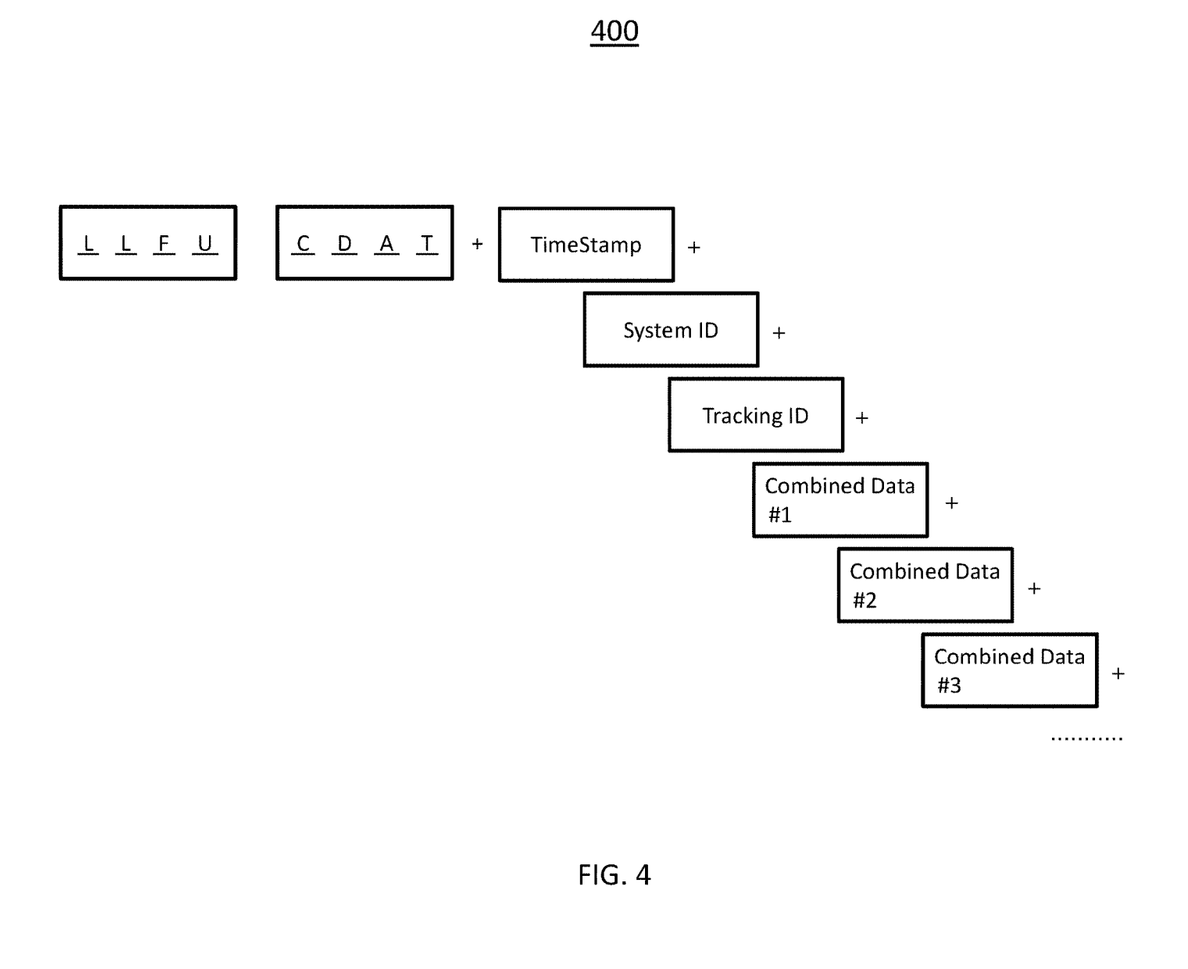
FIG. 4 illustrates a message used in a system for utilizing an error prediction and avoidance component for a transaction processing system.

FIG. 4 provides a format 400 of the data message for utilizing an error prediction and avoidance component for transaction processing systems. In one or more embodiments, the messages are exchanged between the error prediction and avoidance component and the DPC. In an embodiment, two types of messages are exchanged between the error prediction and avoidance component. One message type is a data message which is transmitted to the DPC, and the second message type is a summary message transmitted to the error prediction and avoidance component.

The data message can include several fields. For example, the fields include a length of message field (L), critical function codes (F), and focus area codes (U). The message length field can indicate a start and end location. In a different example, the message length can indicate the length. Example critical function codes can include 01: Open Transaction Manager; 02: Open Database Manager; 03: High Availability Large Database; etc. The focus area codes (U) are based at least in part on the critical functions of the TPS. For example, a critical function of an IMS TPS having a critical function code 01: Open Transaction Manager can include the following focus areas 01: Flooding for synchronous transaction; 02: Hung transactions; 03: Delayed transaction output; 04: Resource cleanup for transaction pipes; 05: Callout; etc. In another embodiment, different critical functions can have different focus areas associated with each respective critical function. Similarly, different types of TPS can have different critical functions having different focus areas.

The data message can also include fields for control flags (C), disposition codes (D), action taken codes (A), and DPC timer information (T). The control flags (C) can indicate a direction in which the message is being transmitted. For example, a control flag 01 can indicate a message is transmitted in the direction to the DPC. The control flag 02 can indicate a message is transmitted in the direction of the error reduction subcomponent. For example, a summary message being transmitted to the error reduction subcomponent can have the control flag 02. The disposition codes (D) indicate a state of the focus error. The disposition codes can include 01: Pre-error state; 02: Error state; and 03: Normal state. An action taken code (A) includes 01: Pre-error mitigated; 02: Failed to mitigate the pre-error, and debugging trace is set ON; 03: no action was taken; etc. The DPC timer (T) can be included in the message to be used by the DPC for generating summarization messages. In addition, the DPC timer (T) can be updated by the error reduction subcomponent during a mitigation process.

The data message can be combined with TimeStamp data indicating when the data was obtained. The DPC is configured to store messages that have been received from the error prediction and avoidance component based on its system ID, tracking ID, critical function ID, and focus area ID. The system ID is used to differentiate between the plurality of transaction processing systems that communicate with the DPC. In one or more embodiments, the DPC can be shared among a plurality of DPCs. In another embodiment, the DPC can be exclusive to a single TPS. The tracking ID can be used to identify a particular external client-server device that is in communication with the TPS. For example, the tracking ID can be associated with a particular TCP/IP client-server ID where a plurality TCP/IP client-servers exist in the system or network.

As shown in FIG. 4, the messages can include the combined data types of FIG. 3. In an embodiment, the messages can include one or more different combined data types. In addition, the messages can include any combination of the fields. These message fields can be updated by the subcomponents of the of the error prediction and avoidance component. For example, the disposition codes (D) and action taken codes (A) can be provided by the error reduction subcomponent, and the system ID and tracking ID can be provided by the data collection and combination subcomponent. The fields can be retrieved by a plurality of techniques and are not limited by the description. The message format provided in FIG. 4 can also be used for the summary messages generated at the DPC.

Figure 5:
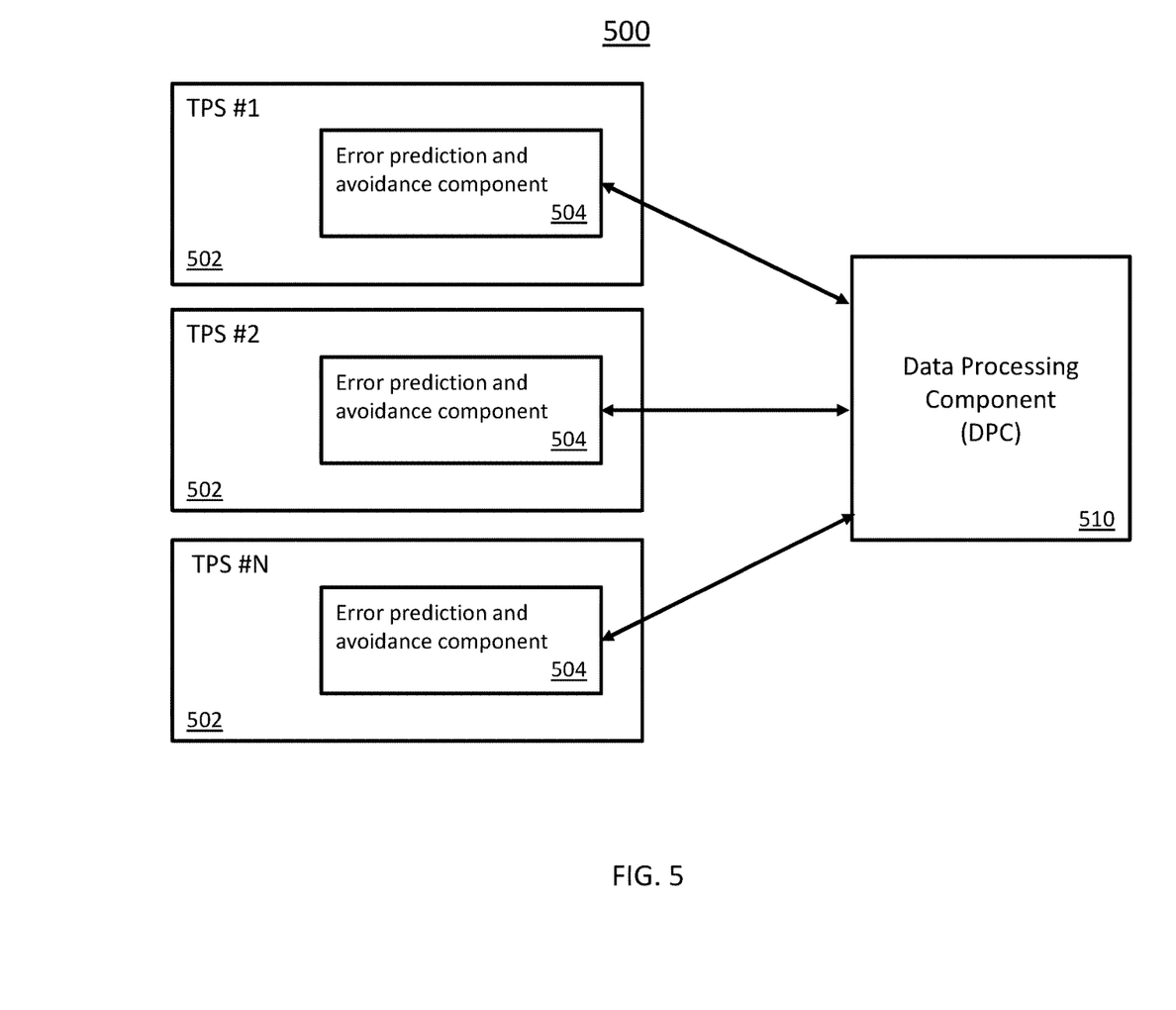
FIG. 5 illustrates a block diagram of a system for utilizing an error prediction and avoidance component for a transaction processing system.

Now referring to FIG. 5, a system 500 for utilizing an error prediction and avoidance component for transaction processing systems is shown. In an embodiment, an environment having a plurality of TPS 502 is shown, where each TPS can include its own error prediction and avoidance component 504 and communicates with a shared DPC 510, where the DPC 510 is located outside of any TPS 502. This configuration allows each TPS to share the information stored at the DPC 510 with the other TPS 502 and conserves the processing power of each TPS 502. In a different embodiment, each of the plurality of TPS 502 can include their own exclusive DPC 510 to process the combined data messages for focus areas of the critical functions. In one or more embodiments, the dedicated DPC 510 can streamline processing for its TPS 502.

Figure 6:
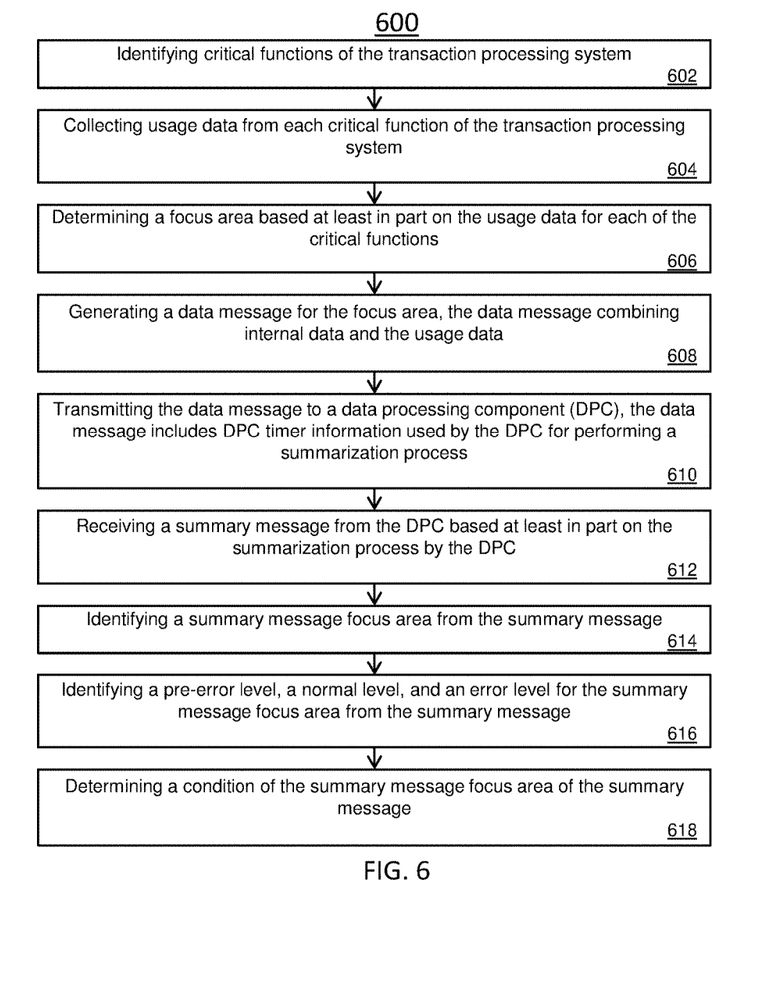
FIG. 6 is a flow diagram illustrating a method for utilizing an error prediction and avoidance component for a transaction processing system.

Now referring to FIG. 6, a method 600 for utilizing an error prediction and avoidance component for transaction processing is shown. The method 600 at block 602 provides identifying critical functions of the transaction processing system. An example transaction processing system includes the IMS, which is a legacy transaction processing system. The IMS includes critical functions such as open Transaction Manager Access (OTMA), Open Database Manager (ODBM) and High Availability Lager Database (HALDB). The TPS customers can each use different critical functions and have different focus areas. Example focus areas for IMS OTMA critical function can be "flooding for synchronous transaction," "hung transactions," "delayed transaction output," "resource cleanup for transaction pipe" and "callout." The error prediction and avoidance component can collect the respective usage data for each critical function for each customer for processing.

Block 604 provides collecting usage data from each critical function of the transaction processing system. In an example, different customers can use the different critical functions of a transaction processing system based on the needs of their enterprise. Block 606 provides determining a focus area based at least in part on the usage data for each of the critical functions. In one or more embodiments, the usage data for each critical function is collected. A focus area can be determined by a frequently used or executed operation. Different customers of transaction processing systems can have different focus areas and the error prediction and avoidance component can collect the usage data. Usage data includes information such as a number of requests, responses, resources, etc. that is associated with a focus area of a critical function.

Block 608 provides generating a data message for the focus area, the data message combining internal data and the usage data. In an example, the internal/insight data includes data such as length of the message, critical function codes, and focus area codes. The internal/insight data can also include control flags, disposition information, action is taken information, and DPC timer information. The internal/insight data can include timestamp information, system ID, and tracking ID.

Block 610 provides transmitting the data message to a data processing component (DPC), the data message includes DPC timer information used by the DPC for performing a summarization process. For example, an initial DPC timer can be set to two minutes. After the data message is generated, it is transmitted to the DPC for processing. The DPC can be configured to store each data message based on the information contained in the data message. For example, the data messages can be saved based at least in part on its system ID, tracking ID, critical function code, and focus area code. The DPC timer is used to determine when to perform a summarization operation to the received data messages in the DPC. The DPC can be configured to activate the DPC timer included in the data message if it is the first data message associated with the data message and/or if the DPC timer has been updated for a data message having a previously processed focus area, where the DPC timer has been updated by an error reduction subcomponent. In an example, if the system is still in a pre-error or an error level, the DPC timer can be updated from two minutes to one minute. The frequency of the generation of the summarization messages can allow the system obtain more information related to the error.

Block 612 provides receiving a summary message from the DPC-based at least in part on the summarization process performed by the DPC. After the DPC timer has expired, a summary message is compiled and transmitted to the error prediction and avoidance component. The summary message is generated from the received data messages associated with a particular focus area that has been stored by the DPC. The summary messages can be based at least in part on the combined data types shown in FIG. 3. In an embodiment, the error reduction subcomponent can be configured to receive the summary message.

Block 614 provides identifying a summary message focus area from the summary message. The received summary message is analyzed to determine a focus area within the summary message for further analysis. In an example, focus area identified in a summary message can indicate 01: Flooding for the synchronous transaction.

Block 616 provides identifying a pre-error level, a normal level, and an error level for the summary message focus area. In one or more embodiments, the various levels can be provided in a message such as the summary message. A threshold level can be provided in a summary message to indicate an error level. For example, when 01: "Flooding for synchronous transactions" has been indicated, the received summary message can include the combined data type indicating type 05: Boundary can be provided where a "threshold limit" and "warning/error level" information can be used to determine the different levels. In addition, other information can be included in the summary message such as the number of hung transactions. For example, a threshold limit of 2000 transactions per minute can be provided in the summary message. A pre-error level can be determined between 60-80% of the transaction limit and an error level can be indicated as 80%.

Block 618 provides determining a condition of the summary message focus area of the summary message. After the various levels are determined for the summary message focus area, a condition or state of the focus group is determined. At least based in part, the error reduction subcomponent can perform an action including a mitigation action based on the present condition of the focus area. In the flooding example, the current state of the focus area can be determined. In an example, the error reduction subcomponent can calculate a pre-error level based on the summary message from the DPC. If the current state is determined to be in the range of 60-80% the error reduction subcomponent can perform a mitigation operation prior to the system reaching an error level status. The error reduction subcomponent can also take the proper action based on determining an error level and a normal level.

Figure 7:
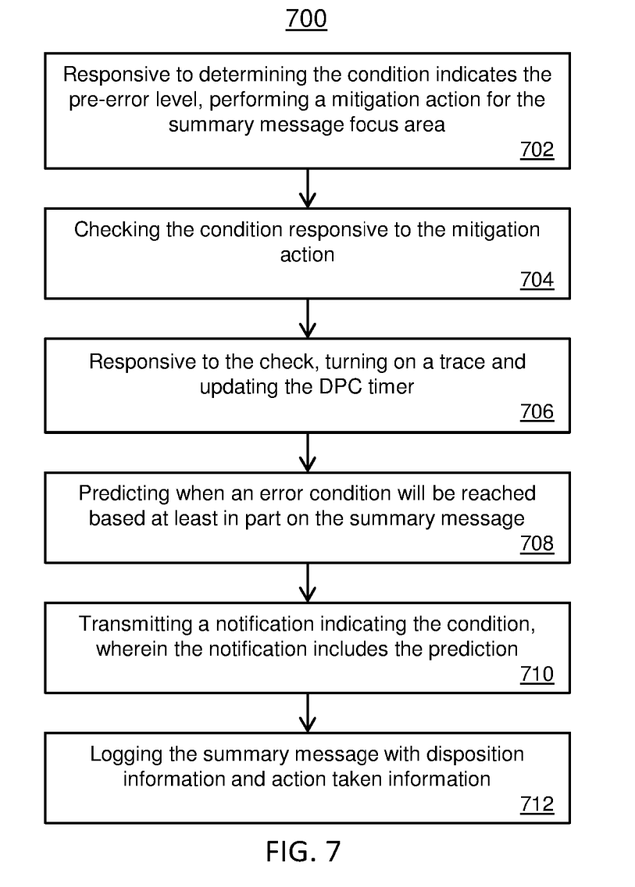
FIG. 7 is a flow diagram illustrating a method for utilizing an error prediction and avoidance component for a transaction processing system.

Now referring to FIG. 7, a method 700 for utilizing an error prediction and avoidance component for transaction processing system is shown. Block 702 provides responsive to determining the condition indicates the pre-error level, performing a mitigation action for the summary message focus area. In this example, the mitigation action can include reducing the number of transactions per minute being performed by the TPS or reducing the number of requests that are serviced by the TPS. Other examples include taking actions to reduce a flooding scenario in the transaction processing system.

Block 704 provides checking the condition responsive to the mitigation action. The error reduction subcomponent can check the condition of the focus area after performing the mitigation operation to determine whether the mitigation action has improved the current condition of the focus area. The error reduction subcomponent can update a disposition code (D) and the action taken code (A) of a message.

Block 706 provides responsive to the check, turning on a trace and updating the DPC timer. In an embodiment, the trace is turned on immediately to track the operations that are potentially causing an error or pre-error level condition prior to receiving a report from a customer. The error reduction subcomponent can update the DPC timer and send the updated timer to the data collection and combination subcomponent, where the data collection and combination subcomponent can include the updated timer in a data message for the focus area to be transmitted to the DPC.

Block 708 provides predicting when an error condition will be reached based at least in part on the summary message. The error reduction subcomponent can predict when an error level will be reached for the focus area based at least in part on the information received in the summary message. For example, a flood that is currently in the pre-error level can use the summary message to predict how long it will take the flood to increase and cause the TPS to enter into an error state. Block 710 provides transmitting a notification, wherein the notification includes the prediction. In one or more embodiments, the notification can be transmitted to the TPS customer. Block 712 provides logging the summary message with disposition information and action taken information. The log can be subsequently used for troubleshooting issues within the TPS.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for utilizing an error prediction and avoidance component for a transaction processing system, the method comprising:
    identifying critical functions of the transaction processing system;
    collecting usage data from each critical function of the transaction processing system;
    determining a focus area based at least in part on the usage data for each of the critical functions;
    generating a data message for the focus area, the data message combining internal data and the usage data;
    transmitting the data message to a data processing component (DPC), the data message includes DPC timer information used by the DPC for performing a summarization process;
    receiving a summary message from the DPC based at least in part on the summarization process performed by the DPC;
    identifying a summary message focus area from the summary message;
    identifying a pre-error level, a normal level, and an error level for the summary message focus area; and
    determining a condition of the summary message focus area of the summary message.

2. The computer-implemented method of claim 1, further comprising responsive to determining the condition indicates the pre-error level, performing a mitigation action for the summary message focus area;
    checking the condition responsive to the mitigation action; and
    transmitting a notification indicating the condition; and
    logging the summary message with disposition information and action taken information for the summary message focus area.

3. The computer-implemented method of claim 2, further comprising responsive to the check, turning on a trace and updating the DPC timer;
    predicting when an error condition will be reached based at least in part on the summary message; and
    transmitting a notification indicating the condition, wherein the notification includes the prediction.

4. The computer-implemented method of claim 1, further comprising responsive to determining the condition indicates an error level, determining whether the transaction processing system has performed a mitigating action to address a pre-error level or error level; and
    determining whether the mitigating action corrected a condition causing the error level,
        responsive to not correcting the condition causing the error level, performing a mitigation action, and
        responsive to correcting the condition causing the error level, logging the summary message with disposition information and action taken information for the summary message focus area.

5. The computer-implemented method of claim 1, further comprising responsive to determining the condition indicates the normal level, turning off any trace; and
    logging the summary message with disposition information and action taken information for the summary message focus area.

6. The computer-implemented method of claim 1, further comprising storing the summary message to a server.

7. The computer-implemented method of claim 1, further comprising updating a critical function based on at least one of a critical function enhancement and a field authorized program analysis report (APAR) being reported to a critical function causes an error prediction and avoidance component to be updated to detect any errors associated with the update.

8. A system for utilizing an error prediction and avoidance component for a transaction processing system, the system comprising:
    a storage medium, the storage medium being coupled to a processor;
    the processor configured to:
        identify critical functions of the transaction processing system;
        collect usage data from each critical function of the transaction processing system;
        determine a focus area based at least in part on the usage data for each of the critical functions;
        generate a data message for the focus area, the data message combining internal data and the usage data;
        transmit the data message to a data processing component (DPC), the data message includes DPC timer information used by the DPC for performing a summarization process;
        receive a summary message from the DPC based at least in part on the summarization process performed by the DPC;
        identify a summary message focus area from the summary message;
        identify a pre-error level, a normal level, and an error level for the summary message focus area; and
        determine a condition of the summary message focus area of the summary message.

9. The system of claim 8, the processor further configured to responsive to determining the condition indicates the pre-error level, perform a mitigation action for the identified focus area;
    check the condition responsive to the mitigation action;
    transmit a notification indicating the condition; and
    log the summary message with disposition information and action taken information for the identified summary message focus area.

10. The system of claim 9, the processor further configured to responsive to the check, turn on a trace and updating the DPC timer;

predict an error condition based on the summary message; and transmit a notification indicating the condition, wherein the notification includes the prediction.

11. The system of claim 8, the processor further configured to responsive to determining the condition indicates an error level, determine whether the transaction processing system has performed a mitigating action to address a pre-error level or error level; and determine whether the mitigating action corrected a condition causing the error level, responsive to not correcting the condition causing the error level, perform a mitigation action, and responsive to correcting the condition causing the error level, log the summary message with disposition information and action taken information for the identified summary message focus area.

12. The system of claim 8, the processor further configured to responsive to determining the condition indicates the normal level, turn off any trace; and log the summary message with disposition information and action taken information for the identified summary message focus area.

13. The system of claim 8, the processor further configured to store the summary message to a server.

14. The system of claim 8, the processor further configured to update a critical function based on at least one of a critical function enhancement and a field authorized program analysis report (APAR) being reported to a critical function causes an error prediction and avoidance component to be updated to detect any errors associated with the update.

15. A computer program product for utilizing an error prediction and avoidance component for a transaction processing system, the computer program product comprising:

a computer readable storage medium having stored thereon first program instructions executable by a processor to cause the processor to:

identify critical functions of the transaction processing system;

collect usage data from each critical function of the transaction processing system;

determine a focus area based at least in part on the usage data for each of the critical functions;

generate a data message for the focus area, the data message combining internal data and the usage data;

transmit the data message to a data processing component (DPC), the data message includes DPC timer information used by the DPC for performing a summarization process;

receive a summary message from the DPC based at least in part on the summarization process performed by the DPC;

identify a summary message focus area from the summary message;

identify a pre-error level, a normal level, and an error level for the summary message focus area; and determine a condition of the summary message focus area of the summary message.

16. The computer program product of claim 15, wherein the instructions are further executable by the processor to cause the processor to responsive to determining the condition indicates the pre-error level, perform a mitigation action for the identified focus area;

check the condition responsive to the mitigation action;

transmit a notification indicating the condition; and log the summary message with disposition information and action taken information for the identified summary message focus area.

17. The computer program product of claim 16, wherein the instructions are further executable by the processor to cause the processor to responsive to the check, turn on a trace and updating the DPC timer;

predict an error condition based on the summary message; and transmit a notification indicating the condition, wherein the notification includes the prediction.

18. The computer program product of claim 15, wherein the instructions are further executable by the processor to cause the processor to responsive to determining the condition indicates an error level, determine whether the transaction processing system has performed a mitigating action to address a pre-error level or error level; and determine whether the mitigating action corrected a condition causing the error level, responsive to not correcting the condition causing the error level, perform a mitigation action, and responsive to correcting the condition causing the error level, log the summary message with disposition information and action taken information for the identified summary message focus area.

19. The computer program product of claim 15, wherein the instructions are further executable by the processor to cause the processor to responsive to determining the condition indicates the normal level, turn off any trace; and log the summary message with disposition information and action taken information for the identified summary message focus area.

20. The computer program product of claim 15, wherein the instructions are further executable by the processor to cause the processor to store the summary message to a server.

* * * * *